Nov. 17, 1964   C. E. MAIER   3,157,335
PLASTIC CUP WITH SPACED AND TAPERED RADIAL HOLLOW PROJECTIONS
OF 90 DEGREES OR LESS IN THE FINGER CONTACT AREA THEREOF
Filed April 18, 1962   2 Sheets-Sheet 1

INVENTOR
CURTIS E. MAIER

BY
*Mason, Porter, Diller & Stewart*
ATTORNEYS

Nov. 17, 1964 C. E. MAIER 3,157,335
PLASTIC CUP WITH SPACED AND TAPERED RADIAL HOLLOW PROJECTIONS
OF 90 DEGREES OR LESS IN THE FINGER CONTACT AREA THEREOF
Filed April 18, 1962 2 Sheets-Sheet 2

INVENTOR
CURTIS E. MAIER
BY Mason, Porter, Diller & Stewart
ATTORNEYS

United States Patent Office 3,157,335
Patented Nov. 17, 1964

3,157,335
PLASTIC CUP WITH SPACED AND TAPERED RADIAL HOLLOW PROJECTIONS OF 90 DEGREES OR LESS IN THE FINGER CONTACT AREA THEREOF
Curtis E. Maier, Chicago, Ill., assignor to Continental Can Company, Inc., New York, N.Y., a corporation of New York
Filed Apr. 18, 1962, Ser. No. 188,386
16 Claims. (Cl. 229—1.5)

This invention relates in general to new and useful improvements in the cup art, and more particularly relates to a novel cup, normally of the disposable type, particularly designed for holding a hot beverage.

At the present time, paper and plastic cups are being used for the dispensing of hot beverages. In order to hold the cost of such cups at a minimum, it is desired that the cups be of a unitary construction, and be of a configuration so that they will nest for dispensing purposes, with the result that the cups are not provided with handles. Accordingly, the rapid transfer of heat from the hot beverage to the cup body results in the presentation of a gripping surface which is in itself too hot to hold on to, or at the best, is uncomfortable to the holder.

In view of the foregoing, it is the object of this invention to provide a novel inexpensive cup of the type having no handle and which is of a construction wherein a relatively cool gripping portion is provided on the cup, the gripping portion being provided with only limited areas for contact by the holder's fingers and thumb, and these areas of contact being much cooler than the remainder of the cup body, with the result that the cup may be readily handled even though filled with a hot beverage.

Another object of this invention is to provide a novel method of insulating a cup for a hot beverage, the method including the provision of pools of the hot liquid or beverage, which pools are disposed entirely outwardly of the general confines of the body of the cup and with the liquid of the pools being stationary, and the portion of the cup containing the pools of liquid being provided with means for effecting the rapid cooling of such pools so that the isolated pools of the liquid are relatively cool as compared to the hot liquid of the container, wherein the liquid itself forms the insulation.

Another object of this invention is to provide a novel cup having a grip portion which is insulated as compared to the remainder of the cup body, the grip portion being in the form of a plurality of vertically spaced, outwardly directed protuberances which are disposed circumferentially around the cup body, and each of the protuberances being generally horizontally V-shaped in cross-section and terminating in a sharp outer part with the enclosed angle being less than 90 degrees, whereby circulation of external cooling air above and below the protuberances is possible to effect a good cooling of relatively stationary pools of liquid disposed within the protuberances with the so cooled liquid forming insulation for the protuberances with respect to the hot beverage disposed within a cup.

Another object of this invention is to provide a novel disposable cup which is suitable for stacking and dispensing purposes, the cup having a gripping portion which is formed of a plurality of circumferentially extending ribs which are vertically spaced and which ribs are generally V-shaped in horizontal cross-section to present relatively sharp outer edges, the spacing of the edges being such so as to prevent the engagement of a holder's fingers with the main body of the cup and the protuberances being provided with a much greater cooling area for the liquid disposed therein than the cup body so that the protuberances not only present relatively sharp finger engaging surfaces, but also are much cooler than the remainder of the cup body.

Still another object of this invention is to provide a novel cup which may be readily and economically molded from a plastic material and which cup includes a cup body having a plurality of conical protuberances projecting from an upper portion thereof, the conical protuberances combining to define a gripping portion of the cup with the conical protuberances being spaced, both horizontally and vertically, to prevent the engagement of the fleshy part of one's fingers and thumb with the main body of the cup, and the protuberances being provided with a very large cooling area to liquid entrapped therein ratio as compared to the main portion of the cup body, wherein the protuberances are relatively cool as compared to the cup body, and may be readily gripped while the remainder of the cup body is of a temperature which would be uncomfortable to the touch due to the hot beverage contained within a cup.

A still further object of this invention is to provide a novel plastic cup construction which includes a plurality of outwardly projecting protuberances molded from the body of the cup, the protuberances serving to entrap small pools of liquid of a hot beverage disposed within the cup and not only presenting greater cooling areas per unit of liquid as compared to the remainder of the cup, but also being formed of a thinner material than the remainder of the cup wherein liquid trapped within the protuberances is rapidly cooled and the protuberances are then insulated from the remainder of the hot beverage by the relatively cool liquid trapped therein.

Yet another object of this invention is to provide a novel plastic cup construction which has an upper grip portion particularly configurated so as to provide for insulation of the area of the cup contacted by one's hand from the hot beverage disposed within the cup, the cup construction including a plurality of closely nested, generally conical protuberances which serve to trap liquid and wherein the liquid is rapidly cooled by transfer of heat to the atmosphere, after which the liquid trapped therein serves to insulate the remainder of the hot beverage within the cup.

Another object of this invention is to provide a novel plastic cup construction for hot beverages in accordance with the foregoing wherein the protuberances are nested, but the nesting is loosely so as to space the protuberances completely from one another and thus provide lands intermediate the protuberances.

A still further object of this invention is to provide a novel plastic cup construction which includes a plurality of outwardly projecting protuberances molded from the body of the cup, the protuberances serving to trap small pools of liquid of a hot beverage disposed within the cup and not only presenting a greater cooling area per unit of liquid as compared to the remainder of the cup, but being formed of materials of substantially the same thickness as the remainder of the cup, the cup being of a type wherein it may be readily formed by an injection molding process.

With the above and other objects in view that will hereinafter appear, the nature of the invention will be more clearly understood by reference to the following detailed description, the appended claims and the several views illustrated in the accompanying drawings:

Figure 1:
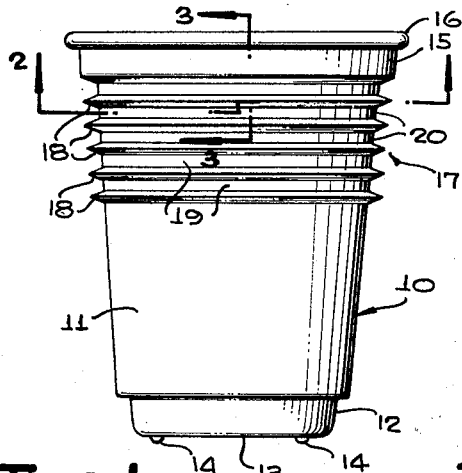
FIGURE 1 is an elevational view of a first form of cup in accordance with this invention, and shows the general details thereof.
Figure 2:
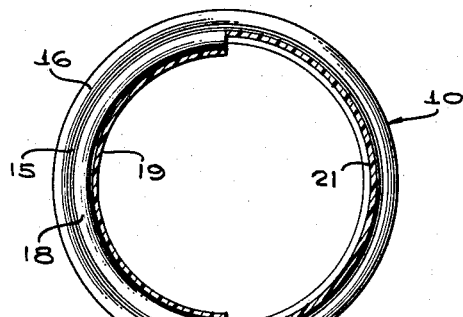
FIGURE 2 is a horizontal sectional view taken along the line 2—2 of FIGURE 1, and shows the general cross-section of the cup.
Figure 3:
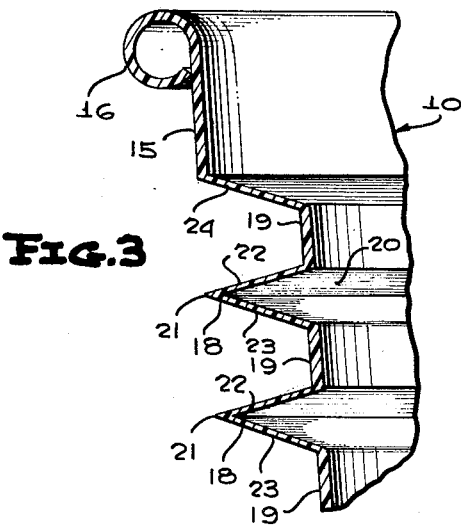
FIGURE 3 is an enlarged fragmentary vertical sectional view taken along the line 3—3 of FIGURE 1, and shows more specifically the details of the grip portion of the cup.

In referring to the drawing, reference is first made to the form of the invention illustrated in FIGURES 1, 2 and 3, the cup illustrated in these figures being generally referred to by the numeral 10. The cup 10 includes a cup body 11 which is of a frusto-conical outline. The cup body 11 has a reduced bottom portion 12 which includes a bottom 13 having small pin-like supports 14 projecting downwardly therefrom. The cup body 11 also includes an outwardly flaring upper portion 15 which terminates in an outwardly directed bead 16.

The cup body 11 also includes a grip portion, which is generally referred to by the numeral 17. The grip portion 17 includes a plurality of protuberances in the form of vertically spaced, annular ribs 18. As is best shown in FIGURE 3, adjacent ones of the ribs 18 are separated by flat land portions 19 of the cup body 11.

Each of the ribs 18 is generally V-shaped in horizontal cross-section, and has an open end 20 opening into the interior of the cup 10. The apex of each V-shaped cross-sectional rib 18 opens outwardly from the cup body 11 and defines a sharp outer part 21 adapted to be engaged by a holder's fingers and thumb. It is also to be noted that each of the ribs 18 includes an upper cooling surface 22 and a lower cooling surface 23.

The cup 10 is preferably formed of plastic by a blow molding process, although it could feasibly be formed by a vacuum drawing process. Due to the fact that the ribs 18 are drawn from the same plastic material as the cup body 11, and due to the increase in peripheral length of each rib 18 as compared to a corresponding portion of the cup body 11, it will be noted that the ribs 18 are formed of material of a lesser thickness than the material of the cup body.

When the cup 10 is filled with a hot beverage, such as coffee, cocoa, etc., portions of the hot beverage will run into the interiors of the ribs 18. This hot beverage will become isolated from the remainder of the hot beverage and be in the form of trapped pools of the hot beverage. Due to the relative thinness of the walls of each rib 18 as compared to the thickness of the wall of the cup body 11, and also due to the relatively great cooling area provided by the two surfaces 22 and 23 of each rib 18, with respect to the volume of the hot beverage trapped within each rib 18, as compared to the cooling surface available for all of the remaining hot beverage within the cup 10, it will be seen that the hot beverage trapped within the ribs 18 will be rapidly cooled and will have a much lower temperature than the remainder of the hot beverage within the cup 10.

There will be some circulation of the fluid trapped within each rib 18 with the hot beverage constituting the major portion of the contents of the cup 10. However, that portion of the hot beverage which is trapped in the extreme outer portion of each of the ribs 18 will, for all practical purposes, not be circulated. Since the volume of the trapped beverage reduces towards the sharp edge 21 of each rib 18 while the amount of cooling surface and volume of the plastic material available for transfer of heat from the hot beverage increases, it will be apparent that the beverage disposed in the extreme outer portion of each rib is relatively cool as compared to the remainder of the beverage within the cup 10. As a result, the extreme outer portions of the ribs 18, particularly the sharp outer parts 21, will be relatively cool.

The spacing of the ribs 18 is such that when the grip portion 17 is grasped by a holder, the fleshy portion of the holder's fingers and thumb will not pass in between the ribs 18 and engage the main portion of the cup body 11, but will engage primarily the sharp outer parts 21 of the ribs 18. Thus, the holder's fingers and thumb will engage only the relatively cool portion of the cup and since this portion of the cup has been cooled to a temperature below that which is uncomfortable to the touch, it will be seen that the grip portion 17 provides for the ready handling of the cup 10 although it is filled with an extremely hot beverage.

At this time, it is pointed out that the enlarged upper portion 15 of the cup 10 has a bottom wall portion 24 which corresponds generally to the undersurface of each of the ribs 18. It is also to be noted that the outer wall of the upper portion 15 is so positioned so that a projection thereof would pass through the sharp outer parts 21 of the ribs 18. This, combined with the reduced lower portion 12 of the cup body 11 permits the necessary nesting of the cup 10 with like cups and the ready dispensing of the lowermost nested cup for use in a vending machine and the like.

Figure 4:
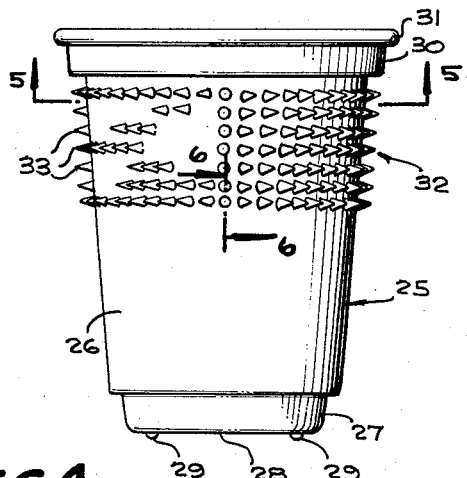
FIGURE 4 is an elevational view of a modified form of cup and shows the general details thereof.
Figure 5:
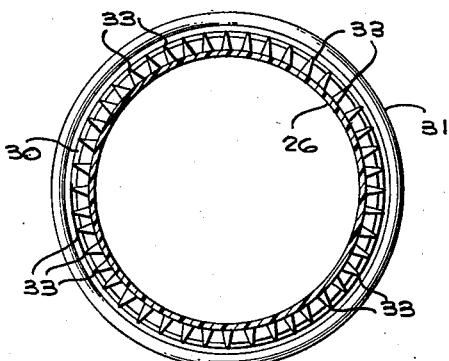
FIGURE 5 is a horizontal sectional view taken along the line 5—5 of FIGURE 4, and shows the specific arrangement of the protuberances projecting outwardly from the cup body.
Figure 6:
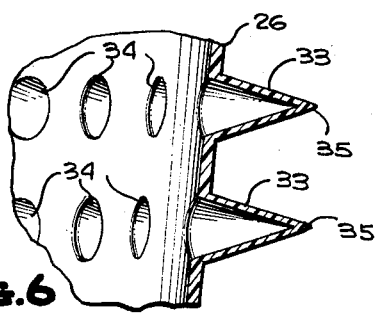
FIGURE 6 is an enlarged fragmentary vertical sectional view taken along the line 6—6 of FIGURE 4, and shows the specific details of several of the protuberances, including the cross-section thereof.

In FIGURES 4, 5 and 6 of the drawing, there is illustrated a modified form of cup which is generally referred to by the numeral 25. The cup 25 is somewhat similar to the cup 10 and has the same basic construction as the cup 10, the only difference between the cup 10 and the cup 25 being the grip portions thereof. The cup 25 includes a generally frusto-conical cup body 26 which has a reduced lower portion 27 closed by a bottom 28. The bottom 28 is provided with spaced downwardly projecting support pins 29. The cup body 26 also includes an enlarged upper portion 30 which terminates in an outwardly directed bead 31. The cup body 26 also includes a grip portion 32 which is disposed below the enlarged upper portion 30.

The grip portion 32 is defined by a plurality of conical protuberances 33. Each protuberance 33 is of a conical configuration and has a horizontal axis. The protuberances 33 are disposed in rows, both vertically and circumferentially of the cup body 26. It is to be noted that each protuberance 33 has an open part 34 at the inner end thereof which opens into the interior of the cup 25 so that hot beverage disposed within the cup 25 may have portions thereof flow into the interiors of the protuberances 33.

Each protuberance 33 is generally of a horizontal V-shaped cross-section and has its apex disposed outermost, the apex of each protuberance 33 being in the form of a sharp outer part 35. The sharp outer parts 35 of all of the protuberances 33 lie within a projection of the outer wall of the enlarged upper portion 30 of the cup 25, as is clear from FIGURE 4.

It is to be understood that the spacing of the protuberances 33 will be such that when a holder grips the cup 25, the fingers and thumb of the holder will engage only the protuberances 33, with no part of the fingers or thumb engaging the cup body proper. Further, engagement of the holder's fingers and thumb with the protuberances 33 will be primarily restricted to the sharp outer parts 35.

When the cup 25 is filled with a hot beverage, certain of the beverage will flow into the interiors of the protuberances 33 where to a certain degree this beverage will be trapped. There will be a slight thermal separation of the beverage disposed in that portion of each protuberance remote from the sharp outer part 35, but that beverage disposed in the extreme outer part of each protuberance 33 will remain trapped and stationary for all practical purposes. This trapped beverage is rapidly cooled and, after being cooled, serves as an insulation against the transfer of heat from the main body of the hot beverage to the extreme outer parts of the protuberances 33. It is to be noted that each protuberance 33 provides an extremely large cooling area for the beverage trapped therein as compared to the cooling area of the remainder of the cup 25 for the remainder of the hot beverage. In addition, in the formation of the cup 25, which is normally formed from plastic, there is a stretching of the plastic material with the result that the protuberances 33 have a wall thickness of a lesser dimension than the wall thickness of the cup body 26. This, of course, aids in the transfer of heat.

It will be readily apparent that when the cup 25 is filled with a hot beverage, and the cup is engaged by the grip portion 32 thereof only, the transfer of heat to the holder's fingers and thumb will be relatively small and the temperatures encountered will not be sufficiently high to cause discomfort. Thus, although the cup 25 may contain an extremely hot beverage, it may be readily held without any discomfort whatsoever.

Due to the specific configuration of the cup 25, including the enlarged upper portion 30 and the reduced cross-section lower portion 27, although the grip portion 32 includes a plurality of the outwardly projecting protuberances 33, the cups 25 may be readily nested and stacked for use in dispensing machines. Further, the lowermost one of the cups 25 will be readily available for immediate dispensing at all times.

From the foregoing, it will be readily apparent that there has been devised a novel method of insulating the exterior surface of a cup for hot beverages so as to prevent the undue transfer of heat to a holder's hand. This method relies upon the principle of, for all practical purposes, trapping a portion of the hot beverage and rapidly cooling this hot beverage which is trapped so as to greatly reduce the temperature thereof as compared to the temperature of the hot beverage disposed elsewhere within the cup. By producing a rapid cooling effect on the trapped beverage and at the same time preventing undue circulation of the trapped beverage with the remainder of the hot beverage disposed within the cup 25, it will be readily apparent that although the cup 25 is of a one-piece construction, the sharp outer edges 35 of the protuberances 33 and the adjacent surface areas of the protuberances 33 will be of a much lesser temperature than the reminder of the cup 25, the reduced temperature of the protuberances being within the temperature range wherein the cup may be readily handled by an individual without any undue discomfort.

Figure 7:
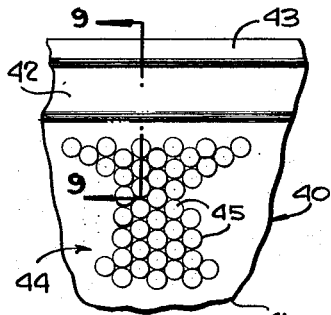
FIGURE 7 is a fragmentary elevational view of an upper portion of a modified form of cup, wherein the protuberances are disposed in closely nested relation.
Figure 9:
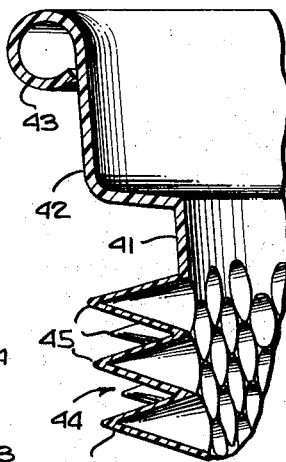
FIGURE 9 is an enlarged fragmentary vertical sectional view taken along the line 9—9 of FIGURE 7, and shows the specific details of several of the protuberances, including the cross-section thereof.

In FIGURES 7 and 9 of the drawings, there is illustrated another form of cup which is generally referred to by the numeral 40. The cup 40 is constructed very similar to the cup 25, with the only difference between the two cups being the grip portion thereof. The cup 40 includes a generally frusto-conical cup body 41 which preferably will have a reduced lower portion closed by a bottom, as in the case of the cups 10 and 25. The cup body 41 also includes an enlarged upper portion 42 which terminates in an outwardly directed bead 43. The cup body 41 further includes a grip portion, which is generally referred to by the numeral 44, and is disposed below the enlarged upper portion 42.

The grip portion 44 is defined by a plurality of conical protuberances 45. Each protuberance 45 is of a conical configuration and has a horizontal axis. The protuberances 45 are disposed in rows, both vertically and circumferentially of the cup body 41 and are disposed in closely nested relation. Although, as is clearly shown in FIGURE 9, the protuberances 45 disposed in the vertical rows are immediately adjacent each other at their centers, it is to be understood that nesting of the circular bases of the protuberances 45 without clearance is impossible, and as a result, minor lands are disposed between adjacent ones of the protuberances 45.

The cup 40 has been formed from a sheet by a vacuum molding process, for example, and as a result, the walls of the protuberances 45 are thinner than the remainder of the cup body 41. It is to be noted that the protuberances 45 open into the interior of the cup 40 at the bases thereof so that when the cup 40 is filled with a hot beverage, portions of the hot beverage will flow into the interiors of the protuberances 45. Due to the fact that the interiors of the protuberances 45 are disposed out of the general confines of the cup 40, the beverage which flows into the protuberances 45 will be, to a great degree, trapped. Since this beverage is isolated and exposed to the surfaces of the protuberances 45 which, in turn, are exposed to the atmosphere, it will be seen that this trapped beverage is rapidly cooled and, after being cooled, serves as an insulation against the transfer of heat from the main body of the hot beverage within the cup 40 to the extreme outer parts of the protuberances 45.

It will be obvious that the protuberances 45 are so arranged that when the grip portion 44 is engaged by one's thumb and fingers, it will be impossible for one to engage the cup body 41, the protuberances 45 serving as the complete supporting surfaces disposed in contact with the thumb and fingers. As a result, when the cup 40 is properly picked up, only insulated portions of the cup will be engaged.

Figure 10:
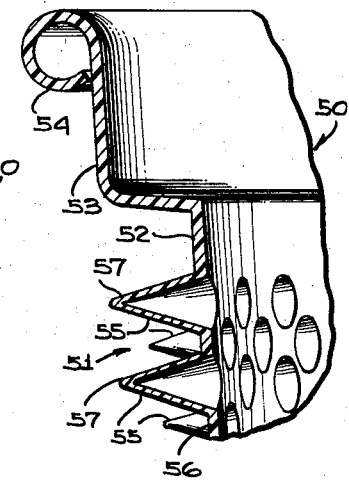
FIGURE 10 is an enlarged fragmentary vertical sectional view taken along the line 10—10 of FIGURE 7 and shows the specific details of the protuberances and the relationship of adjacent protuberances to one another.
Figure 8:
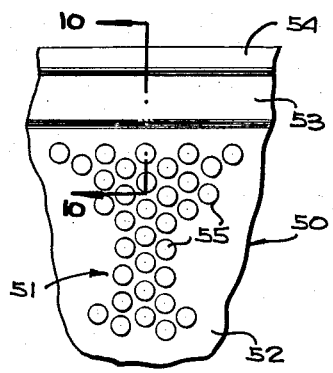
FIGURE 8 is a fragmentary elevational view of an upper portion of another form of cup which is similar to the cup of FIGURE 7, but wherein the protuberances are more loosely nested.

Reference is now made to FIGURES 8 and 10 wherein another form of cup, generally referred to by the numeral 50, is illustrated. The cup 50 is also identical with the cups 10, 25 and 40, with the exception of the details of a grip portion 51 thereof to be described hereinafter. The cup 50 includes a generally frusto-conical cup body 52 which includes a lower portion closed by a bottom, the lower portion and the bottom not being shown, but desirably being of the configuration shown with respect to the cups 10 and 25. The cup body 52 also includes an enlarged upper portion 53 which terminates in an outwardly directed bead 52. The grip portion 51 is part of the cup body 50 and is disposed below the enlarged upper portion 53.

The grip portion 51 is very similar to the grip portion 44 in that it is formed of a plurality of conical protuberances 55. The protuberances 45, like the protuberances 45, are disposed in nested relation and are arranged in rows, both vertically and circumferentially of the cup body 52. However, the protuberances 55 are loosely nested, as opposed to the tight nesting of the protuberances 45 with the result that each protuberance 55 has a land 56 disposed entirely therearound, as is clearly shown in FIGURE 10.

The protuberances 55, like the protuberances 33 and 45, open into the main portion of the cup 50 at the bases thereof and are intended to receive therein trapped portions of the beverage contained within the cup 50. Also, it is to be noted that the walls of the protuberances 55 are thinner than the remainder of the cup 50, with the result that there is rapid transfer of heat through the protuberances 55. The cup 50 is preferably formed from a sheet of plastic through a suitable vacuum molding process, for example.

It is to be noted that although the protuberances 55 are loosely nested, as opposed to the tight nesting of the protuberances 45, the protuberances 55 will be arranged sufficiently close to one another wherein only the extreme points 57 of the protuberances will be engaged by one's thumb and fingers when the cup 50 is properly gripped around the grip portion 51 thereof. Thus, as in the case of the other forms of cups disclosed hereinabove, the grip portion 51 will be insulated as compared to the remainder of the cup 50 by the trapped beverage within the protuberances, and the cup 50 may be readily gripped even though it is filled with a very hot beverage, such as coffee, for example.

Figure 11:
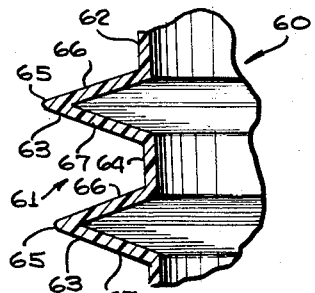
FIGURE 11 is an enlarged fragmentary vertical sectional view taken through a cup constructed similar to that of FIGURE 1 wherein the cup is formed by an injection molding process and the walls of the protuberances are of the same thickness as the remainder of the cup.

Reference is now made to FIGURE 11, wherein there is illustrated an intermediate portion of a cup, generally referred to by the numeral 60. The cup 60 is constructed in the same general manner as the cup 10 and differs therefrom in that the cup 60 would be formed by an injection molding process so that all portions thereof may have the same wall thickness. Only the grip portion of the cup 60 has been illustrated, the grip portion being referred to by the numeral 61 and projecting from the cup body 62. Like the cup 10, the cup 60 has the grip portion 61 thereof formed of a plurality of V-shaped cross-sectional ribs 63 which open outwardly from the cup body 62. The ribs 63 are separated by suitable lands 64.

Each of the ribs 63 has an apex which opens outwardly from the cup 62 and defines a slightly rounded outer part 65 adapted to be engaged by a holder's fingers and thumb. It is also to be noted that each of the ribs 63 includes an upper cooling surface 66 and a lower cooling surface 67.

The cup 60 is otherwise formed the same as the cup 10. However, the slight increase in thickness of the ribs 63 as compared to the thickness of the ribs 18 provides for a slightly stronger cup construction, and although the thicker ribs 63 will not transfer heat quite as rapidly as the thinner ribs 18, the insulating characteristics of the cup 60 will be substantially the same as those of the cup 10.

Figure 12:
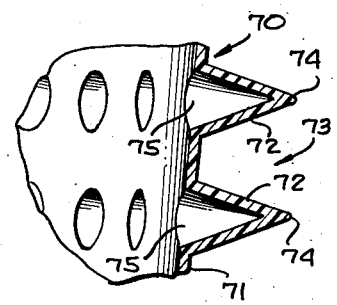
FIGURE 12 is an enlarged fragmentary vertical sectional view similar to FIGURE 6, and shown a cup similar to that of FIGURE 6 wherein the cup is formed by an injection molding process and the wall thickness thereof is substantially constant throughout.

In FIGURE 12, there is illustrated a form of cup construction, generally referred to by the numeral 70, which corresponds to the cup 25. The cup 70 is of the same broad configuration as the cup 25 and differs therefrom primarily in that it is formed by an injection molding process and is of a constant wall thickness.

The cup 70 includes a cup body 71 having a plurality of vertically spaced, circumferentially extending rows of conical protuberances 72 which define a grip portion, generally referred to by the numeral 73. The protuberances 72 are substantially identical with the protuberances 33, with the exception that the extreme ends 74 of the protuberances 72 are rounded, and the walls of the protuberances 72 are substantially of the same thickness as the cup body 71. The protuberances 72 are hollow and open into the main portion of the cup body, as at 75. It is to be understood that the advantages of the cup 10 compare favorably to those of the cup 25.

Figure 13:
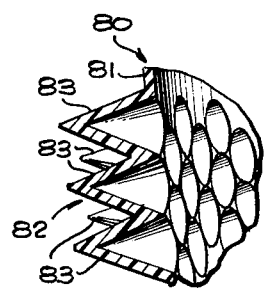
FIGURE 13 is an enlarged fragmentary vertical sectional view through a cup similar to the cup of FIGURE 9 wherein the cup is formed by an injection molding process.

Another form of cup, generally referred to by the numeral 80, is illustrated in FIGURE 13. The cup 80 corresponds to the cup 40 and differs therefrom in that it is formed by an injection molding process so that the thicknesses of all walls of the cup 80 are substantially the same. The cup 80 differs from the cup 40 only in that the cup body 81 is formed with a grip portion 82 defined by a plurality of nested, conical protuberances 83 which are of the same wall thickness as the cup body 81. The cup 80 has substantially the same advantages as the cup 40, and is handled by gripping the grip portion 82 thereof.

Figure 14:
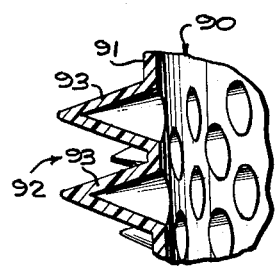
FIGURE 14 is an enlarged fragmentary vertical sectional view through a cup similar to the cup of FIGURE 10 wherein the cup is formed by an injection molding process.

In FIGURE 14, there is illustrated a further form of cup, generally referred to by the numeral 90. The cup 90 includes a cup body 91 having a grip portion, generally referred to by the numeral 92. The cup 90 is formed in the same manner as is the cup 50, with the exception that the grip portion 92 is slightly modified as compared to the grip portion 51. The cup 90 is preferably formed by an injection molding process so that all of the walls thereof are of substantially the same thickness. As a result, the grip portion 92, which is formed of a plurality of loosely nested protuberances 93, has a constant wall thickness, having walls of the same thickness as the remainder of the cup body 91. The cup 90 is handled in the same manner as is the cup 50 and serves to provide an insulated grip area 92 in the same manner as the cup 50 provides the insulated grip area 51.

From the foregoing, it will be seen that novel and advantageous provision has been made for carrying out the desired end. However, attention is again directed to the fact that variations may be made in the example cup constructions disclosed herein without departing from the spirit and scope of the invention, as defined in the appended claims.

I claim:

1. A cup particularly adapted for holding hot beverages without unduly transferring the heat of beverages to a holder's hand, said cup comprising a thin walled generally frusto-conical body and an open mouth, said body being entirely of a single walled construction throughout and including an upper gripping band below said open mouth, said gripping band being comprised of a plurality of vertically spaced outwardly directed substantially hollow protuberances disposed circumferentially around said body, each of said protuberances being horizontally V-shaped in cross-section and terminating in a sharp outer part with the enclosed angle being less than 90 degrees providing circulation of external cooling air above and below each protuberance to effect a good cooling of relatively stationary pools of liquid disposed within the protuberances to restrict heat transfer by the sharp outer part of each protuberance, the vertical spacing of said protuberances being relatively small and defined by flat intermediate portions of said cup body whereby when said gripping band is engaged by one's fingers and thumb, engagement with the cup is limited to said protuberances and in the vicinity of said protuberances sharp outer parts, the cup body having an enlarged extreme upper portion, said protuberances having a wall thickness less than the wall thickness of said cup body and terminating in sharp outer parts which are disposed along an imaginary projection of said enlarged upper portion, and a horizontal axis normal to the axis of the cup body bisecting the enclosed angle of said protuberances.

2. The cup of claim 1 wherein said protuberances are in the form of annular ribs, and each annular rib is substantially symmetrical about a horizontal plane passing through the sharp outer parts thereof.

3. The cup of claim 1 wherein said protuberances are spaced circumferentially around said cup body and arranged in staggered vertical and horizontal rows.

4. The cup of claim 1 wherein said protuberances are in the form of annular ribs.

5. A cup particularly adapted for holding hot beverages without unduly transferring the heat of beverages to a holder's hand, said cup comprising a thin walled generally frusto-conical body and an open mouth, said body being entirely of a single walled construction throughout and including an upper gripping band below said open mouth, said gripping band being composed of a plurality of thin walled, substantially conical outward protuberances having small area peak portions, the outward protuberances being spaced from one another both circumferentially about the gripping band and axially across the gripping band lying closely in relation one to another, providing air circulating space between said protuberances of the gripping band and between thumb or finger portions engaging said protuberances and body wall portions underlying and not contacted by a thumb or finger engaging said protuberances so that a finger or thumb of a person gripping the cup body at said gripping band will engage only said small area peak portions of the thin walled protuberances and not main body portions of the body between the protuberances.

6. A cup particularly adapted for holding hot beverages without unduly transferring the heat of beverages to a holder's hand, said cup comprising a thin walled generally frusto-conical body and an open mouth, said body being entirely of a single walled construction throughout and including an upper gripping band below said open mouth, said gripping band being composed of a plurality of thin walled outward protuberances, the wall thickness of each of said protuberances being substantially less than the normal wall thickness of the cup body thereby facilitating the rapid transfer of heat therethrough, and said outward protuberances having small area peak portions, the outward protuberances being spaced from one another both circumferentially about the band and axially across the band and lying closely in relation one to another providing air circulating space between said protuberances of the gripping band and between thumb or finger portions engaging said protuberances and body wall portions underlying and not contacted by a thumb or finger engaging said protuberances so that a finger or thumb of a person gripping the cup body at said gripping band will engage only said small area peak portions of the thin walled protuberances and not main body portions of the body between the protuberances.

7. A cup particularly adapted for holding hot beverages without unduly transferring the heat of beverages to a holder's hand, said cup comprising a thin walled generally frusto-conical body and an open mouth, said body being entirely of a single walled construction throughout and including an upper gripping band below said open mouth, said gripping band being composed of a plurality of thin walled substantially conical outward protuberances, the wall thickness of each of said protuberances being substantially less than the normal wall thickness of the cup body thereby facilitating the rapid transfer of heat therethrough, said outward protuberances having small area peak portions, the outward protuberances being spaced from one another both circumferentially about the band and axially across the band and lying closely in relation one to another providing air circulating space between said protuberances of the gripping band and between thumb or finger portions engaging said protuberances and body wall portions underlying and not contacted by a thumb or finger engaging said protuberances so that a finger or thumb of a person gripping the cup body at said gripping band will engage only said small area peak portions of the thin walled protuberances and not main body portions of the body between the protuberances.

8. A cup particularly adapted for holding hot beverages without unduly transferring the heat of beverages to a holder's hand, said cup comprising a thin walled generally frusto-conical body and an open mouth, said body being entirely of a single walled construction throughout and including an upper gripping band below said open mouth, said gripping band being composed of a plurality of thin walled, substantially conical outward protuberances having small area peak portions, said cup body having an enlarged extreme upper portion, said small area peak portions being disposed along a lower projection of said enlarged upper portion, the outward protuberances being spaced from one another both circumferentially about the gripping portion and axially across the gripping portion and lying closely in relation one to another providing air circulating space between said protuberances of the gripping band and between thumb or finger portions engaging said protuberances and body wall portions underlying and not contacted by a thumb or finger engaging said protuberances so that a finger or thumb of a person gripping the cup body at said gripping band will engage only said small area peak portions of the thin walled protuberances and not main body portions of the body between the protuberances.

9. A cup particularly adapted for holding hot beverages without unduly transferring the heat of beverages to a holder's hand, said cup comprising a thin walled generally frusto-conical body and an open mouth, said body being entirely of a single walled construction and including an upper gripping band below said open mouth, said gripping band being composed of a plurality of thin walled outward protuberances being spaced from one another axially across the gripping portion, each of the protuberances being in the form of an annular rib, each annular rib being substantially horizontally V-shaped in cross section, each annular rib terminating in a sharp outer part with the enclosed angle being less than 90 degrees and each annular rib being symmetrical about a horizontal plane passing through the sharp outer part and lying closely in relation one to another providing air circulating space between said protuberances of the gripping band and between thumb or finger portions engaging said protuberances and body wall portions underlying and not contacted by a thumb or finger engaging said protuberances so that a finger or thumb of a person gripping the cup body at said gripping band will engage only said small area peak portions of the thin walled protuberances and not main body portions of the body between the protuberances.

10. The cup of claim 5 wherein said protuberances are also arranged in symmetrical vertical and horizontal rows.

11. The cup of claim 6 wherein said protuberances are also arranged in symmetrical vertical and horizontal rows.

12. The cup of claim 5 wherein said protuberances are disposed in nested relation and arranged in vertical and circumferential sets of rows with adjacent rows of each of said sets of rows being in staggered relation.

13. The cup of claim 6 wherein said protuberances are disposed in nested relation and arranged in vertical and circumferential sets of rows with adjacent rows of each of said sets of rows being in staggered relation.

14. The cup of claim 5 wherein a land extends entirely around each of said protuberances.

15. The cup of claim 6 wherein a land extends entirely around each of said protuberances.

16. A cup particularly adapted for holding hot beverages without unduly transferring the heat of beverages to a holder's hand, said cup comprising a thin walled generally frusto-conical body and an open mouth, said body being entirely of a single walled construction and including an upper gripping band below said open mouth, said gripping band being comprised of a plurality of vertically spaced outwardly directed substantially hollow protuberances disposed circumferentially around said body, each of said protuberances being horizontally V-shaped in cross-section and terminating in a sharp outer part with the enclosed angle being less than 90 degrees providing circulation of external cooling air above and below each protuberance to effect a good cooling of relatively stationary pools of liquid disposed within the protuberances to restrict heat transfer by the sharp outer part of each protuberance, the vertical spacing of said protuberances being relatively small and defined by flat intermediate portions of said cup body whereby when said gripping band is engaged by one's fingers and thumb, engagement with the cup is limited to said protuberances and in the vicinity of said protuberances sharp outer parts, the cup body having an enlarged extreme upper portion, and terminating in sharp outer parts which are disposed along an imaginary projection of said enlarged upper portion, and a horizontal axis normal to the axis of the cup body bisecting the enclosed angle of said protuberances.

References Cited in the file of this patent

UNITED STATES PATENTS

| | | |
|---|---|---|
| 1,842,095 | Hoffman | Jan. 19, 1932 |
| 2,563,352 | Morse | Aug. 7, 1951 |
| 2,717,619 | Whitman | Sept. 13, 1955 |
| 3,045,887 | Caine | July 24, 1962 |
| 3,079,027 | Edwards | Feb. 26, 1963 |
| 3,091,360 | Edwards | May 28, 1963 |

FOREIGN PATENTS

| | | |
|---|---|---|
| Re. 58,857 | France | Nov. 25, 1953 |
| 349,791 | Great Britain | June 4, 1931 |
| 856,958 | Great Britain | Dec. 21, 1960 |
| 1,191,951 | France | Apr. 13, 1959 |
| 1,201,792 | France | July 15, 1959 |